United States Patent
Qualls et al.

(10) Patent No.: US 11,297,091 B2
(45) Date of Patent: Apr. 5, 2022

(54) HTTP LOG INTEGRATION TO WEB APPLICATION TESTING

(71) Applicant: Bank of America Corporation, Charlotte, NC (US)

(72) Inventors: Peggy J. Qualls, Oswego, IL (US); Travis Hoyt, Indian Land, SC (US); Cary Hooper, Fort Worth, TX (US)

(73) Assignee: Bank of America Corporation, Charlotte, NC (US)

( * ) Notice: Subject to any disclaimer, the term of this patent is extended or adjusted under 35 U.S.C. 154(b) by 444 days.

(21) Appl. No.: 16/580,057

(22) Filed: Sep. 24, 2019

(65) Prior Publication Data

US 2021/0092144 A1    Mar. 25, 2021

(51) Int. Cl.
*H04L 65/00* (2022.01)
*H04L 29/06* (2006.01)
*G06F 11/36* (2006.01)
*G06F 16/955* (2019.01)

(52) U.S. Cl.
CPC ...... *H04L 63/1433* (2013.01); *G06F 11/3664* (2013.01); *G06F 11/3688* (2013.01); *G06F 16/9566* (2019.01)

(58) Field of Classification Search
None
See application file for complete search history.

(56) References Cited

U.S. PATENT DOCUMENTS

| | | | |
|---|---|---|---|
| 6,549,944 B1 | 4/2003 | Weinberg et al. | |
| 6,584,569 B2 | 6/2003 | Reshef et al. | |
| 8,051,370 B2 | 11/2011 | Anders, Jr. | |
| 8,326,837 B2 | 12/2012 | Brown et al. | |
| 8,402,013 B2 | 3/2013 | Dutta et al. | |
| 8,869,279 B2 | 10/2014 | Shulman et al. | |
| 8,904,558 B2 | 12/2014 | Shulman et al. | |
| 9,208,309 B2 | 12/2015 | Amit et al. | |
| 9,213,832 B2 | 12/2015 | Amit et al. | |
| 9,264,443 B2 | 2/2016 | Weisman | |

(Continued)

OTHER PUBLICATIONS

"In Introduction to HTTP Basics," https://www.ntu.edu.sg/home/ehchua/programming/webprogramming/HTTP_Basics.html, Oct. 20, 2009.

(Continued)

*Primary Examiner* — Cai Y Chen
(74) *Attorney, Agent, or Firm* — Weiss & Arons LLP

(57) ABSTRACT

A method for securely testing a web application is provided. The method may include analyzing each HTTP log entry that may be included in a centralized web server log file of a web application. Each HTTP log entry may include an endpoint. The endpoint may be a URL path correlating to a location on the web application. Based on the analysis, the method may include identifying each endpoint included in the web application and generating a first web application site-map based on each identified endpoint. The method may further include determining one or more endpoints on the first web application site map, that may be absent from a second web application site map. The second web application site map may include each crawled endpoint within the web application identified via a crawling of the web application by a web application attack tool for identifying security vulnerabilities.

20 Claims, 5 Drawing Sheets

(56) References Cited

U.S. PATENT DOCUMENTS

| | | | |
|---|---|---|---|
| 9,715,592 B2 | 7/2017 | Compagna et al. | |
| 2002/0147805 A1* | 10/2002 | Leshem | H04L 67/22 714/E11.181 |
| 2012/0124661 A1* | 5/2012 | Lee | H04L 63/1416 726/13 |
| 2015/0256551 A1* | 9/2015 | Kang | H04L 63/1408 726/23 |

OTHER PUBLICATIONS

Conrad Constantine, "SIEM and Log Management—Everything You Need to Know But Were Afraid to Ask, Part 1," https://www.alienvault.com/blogs/security-essentials/evervthing-you-wanted-to-know-about-siem-and-log-management-but-were-afraid, AT&T Business, Mar. 7, 2014.

"Hypertext Transfer and Protocol (HTTP/1.1) Semantics and Content," https://tools.ietf.org/htrnl/rfc7231#section-6.5.4. Fielding & Reschke, Jun. 2014.

Virender Singh, "What is HTTP Request, Request Line, Request Header & Request Body," https://www.toolsqa.com/client-server/http-request/. Aug. 27, 2017.

Dr. Michael J. Garbade, "How to Footprint Web Applications," https://www.cybrary.it/0p3n/footprint-web-applications/, Cybrary, May 14, 2018.

Ian Lurie, "What is a Server Log File? What is in It? Why Should I Care?" https://www.portent.com/blog/design-dev/log-file.htm. Portent, Mar. 14, 2019.

Vardhan, "What Is Splunk? A Beginners Guide to Understanding Splunk," https://www.edureka.co/blos/wbat-is-splunk/, Brain4ce Education Solutions Pvt. Ltd., May. 22, 2019.

"Common Log Format," https://en.wikipedia.org/wiki/Common_Log_Format, Wikimedia Foundation, Inc., July 14, 2019.

"Site Map," https://en.wikipedia.org/wiki/Site_map, Wikimedia Foundation, Inc., Jul. 25, 2019.

\* cited by examiner

500 ➔ myDictionary {

HTTP LOG INTEGRATION TO WEB APPLICATION TESTING

FIELD OF TECHNOLOGY

Aspects of the disclosure relate to web application testing. Specifically, aspects of the disclosure relate to leveraging web server log files to generate site maps for use in web application testing.

BACKGROUND OF THE DISCLOSURE

The security level of a web application and/or website is crucial for both the vendors and for the users/buyers/clients accessing the web application. Web developers want to ensure that their data on the web application is secured from any outsider. Web developers also want to ensure that a user's privacy is protected and secure while accessing their web sites. In addition, users' accessing the web application need to be ensured that their privacy will not be compromised while connected and/or associated with the web application.

In order to protect and ensure that the security level is sufficiently secure, there may be a security assessment team involved in the developing of the web application. The security assessment team may test web applications and websites for security vulnerabilities. The testing may be performed by simulating attacks on the websites or its users. The team may obtain a site map of the folder structures of the website provided by web developers of the associated web application and then use the site map to ensure each location within the web application is tested.

Web applications typically involve one, or in many instances, multiple developers to develop the different parts of the website. Since the development of the web application is so complex, there is a difficulty in receiving a complete site map, i.e. —folder structure, of the developed web application and/or website. The lack of a fully-detailed site map may preclude a complete security assessment of the website. Accordingly, certain locations of the website that are not included in the site map may not be tested by the security team and therefore these locations may be vulnerable to attacks.

There are many security information and management ("SIEM") applications that generate and aggregate web server log files from web applications. It would be desirable to have systems and methods leveraging these web server log files in order to generate complete site maps of web applications. These site maps may enable web security teams to perform an accurate security assessment on developing web applications and live web applications.

SUMMARY OF THE DISCLOSURE

Aspects of the disclosure relate to a method for securely testing a web application. The method may include analyzing each hyper-text transfer protocol ("HTTP") log entry comprised in a centralized web server log file. The centralized web server log file may be a log file of HTTP requests received at one or more web servers associated with the web application. Each HTTP log entry may include an endpoint. The endpoint may include a uniform resource locator ("URL") path correlating to a location within the web application.

Based on the analysis of each HTTP log entry, the method may further include identifying each endpoint included in the web application. Each endpoint listed within the centralized web server log file may be an indication of a location on the web application. The location may be accessible by a user of the web application.

Following the identifying of each location within the web application, the method may further include generating a first web application site-map based on each identified endpoint.

Using the first web application site-map, the method may further include determining one or more endpoints on the first web application site map that are not-identified on a second web application site map. The second web application site map may be a site-map generated by a web application attack tool. The second web application site map may be generated based off on each endpoint that may be crawled via the web application attack tool. The web application attack tool may crawl the web application in order to search for and identify security vulnerabilities within the web application.

One or more endpoints that may be absent from the second web application site map. This absence may indicate one or more locations on the web application that have not been crawled by the web application attack tool and have not have been assessed for security vulnerabilities.

Based on the first web application site map and the second web application site-map, the method may further include generating a footprint of the web application. The footprint may include the one or more endpoints from the first web application site map absent from the second web application site map and the crawled endpoints comprised in the second web application site map.

Each HTTP log entry may also include a server response code that is associated with the URL path of the HTTP log entry. The method may further include analyzing the server response code, and based on the server response code, categorizing each HTTP log entry as either a valid HTTP server response or an invalid HTTP server response.

Each HTTP log entry that may be categorized as invalid may indicate that the location on the web application associated with the URL path of the invalid HTTP log entry may not exist within the web application. The method may also include, for each valid HTTP log entry, identifying an active web page correlating to the URL path.

When the URL path associated with the HTTP log entry is linked to a non-active web page on the web application, the method may include deleting the invalid HTTP log entry.

In addition, when the URL path associated with the HTTP log entry is determined to be linked to an active web page on the web application, the method may include correcting the URL path associated with the HTTP log entry. Following correcting the URL path, the method may include re-categorizing the invalid HTTP log entry as the valid HTTP log entry.

The method may further include generating a real-time web application footprint listing each endpoint included in each valid HTTP log entry and each endpoint included in the second web application site map. The method may further include overriding the first web application site-map and the second web application site-map with the generated real-time web application footprint.

Following the generating of the real-time web application footprint, the method may further include re-crawling each endpoint listed in the real-time web application footprint, via the web attack tool, to test for security vulnerabilities. The re-crawling may enable testing for security vulnerabilities in locations on the web application that may have been identified only after the web application attack tool already simulated an attack.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 5 shows another exemplary diagram in accordance with principles of the invention.

DETAILED DESCRIPTION OF THE DISCLOSURE

Figure 1:
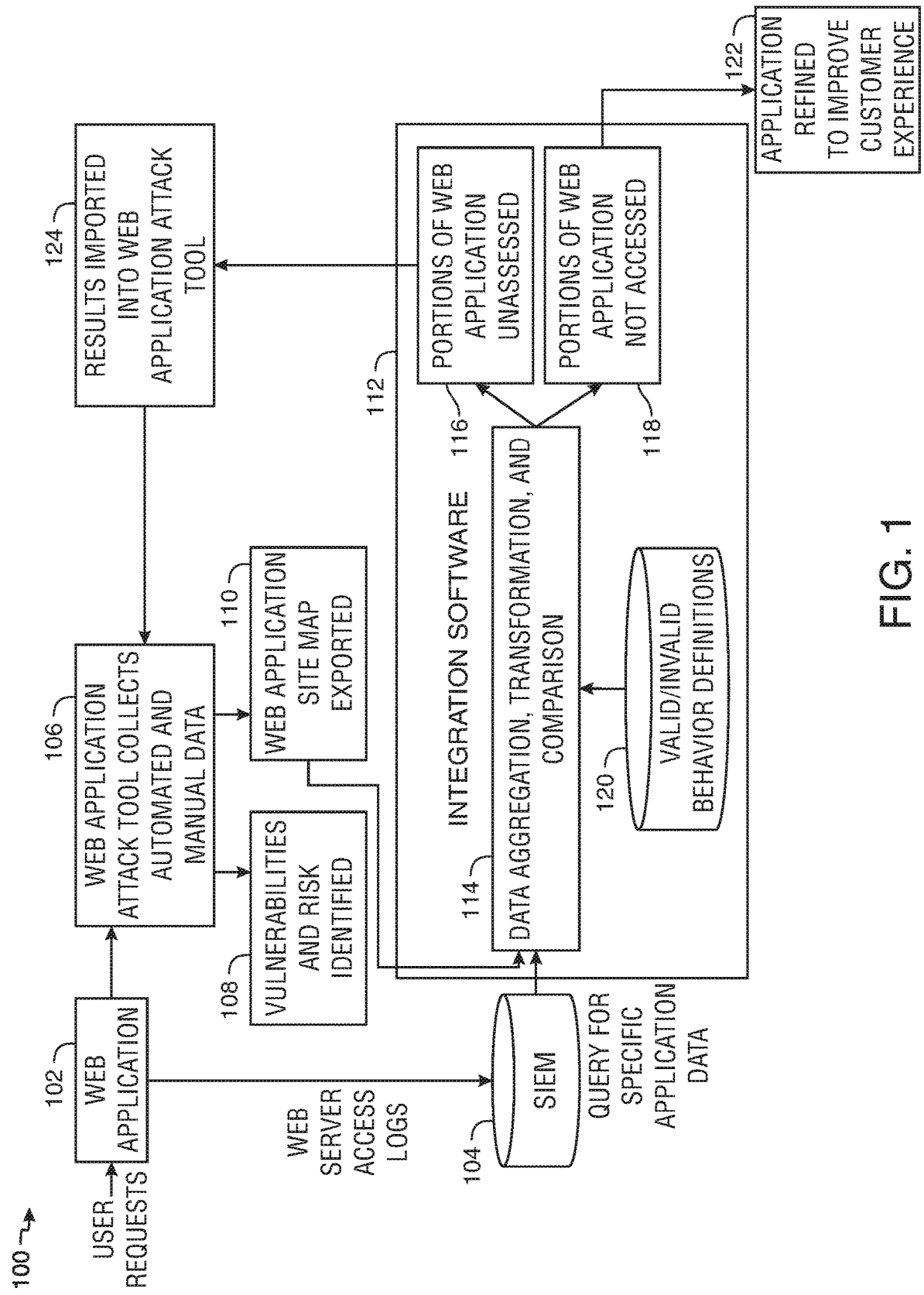
FIG. 1 shows an exemplary diagram in accordance with principles of the invention.

Systems and methods are provided for leveraging web server log files in order to generate complete site maps of web applications. Web applications may also be referred to herein as "website(s)." Web server log files may provide a record of every website resource requested from browser(s) and user-agent(s). Log files may capture areas of web applications that users of the web application may access. Each location that is accessed by a user may be captured and stored as a log entry within the log file. Log files may include raw and unfiltered data. Every time a browser and/or a user-agent requests a resource, the server may add an entry into the log file. The resources may include but may not be limited to pages, images and JavaScript files.

The system may be implemented using Python® technology or a python code library. It should be appreciated that other suitable software technology, software code libraries or software languages may be used to implement this system.

The system may include a three-tier system. The first tier of the system may process delimited files such as CSV, XML, and any other suitable files. The second-tier of the system may use the processed data to generate one or more dictionaries or dictionary trees. It should be appreciated that other suitable data structures may be used to store this processed data. The third-tier of the system may utilize the generated dictionaries and/or dictionary trees to produce JSON® or XML® files. These JSON or XML files may be formatted in such a way to be easily digestible by a variety of software applications. This three-tiered system may enable effective data processing, displaying and report generation.

Each log entry within a web server log file may be in the format of the standardized text file format used by web servers when generating server log files. The format may be known as the National Center for Super Computing Applications ("NCSA") Common Log Format. Since the format is standardized, web analysis programs may be able to readily analyze these files.

Many web applications and websites have more than one server and therefore more than one log file may be generated based off of user requests to the web application. There are many applications that may be configured to collect and aggregate all the log files associated with a web application and generate a centralized web server log file for each web application. These applications may be known as Security Information and Event Management ("SIEM") applications. SIEM applications may be enabled to analyze and cross-reference all the log files into one web application with a single interface. One type of STEM application may be SPLUNK®. Splunk may be enabled to index all the data within the log files. This enables an easier tracking of all the files and folders within the web application. Splunk may identify the distinct folder structure based on all the traffic that comes into a web application and identify each endpoint within the web application.

In accordance with principles of the invention, systems and methods may be implemented to leverage these centralized log files to identify each endpoint within a web application, generate real-time site maps based on the endpoints and securely assess each identified endpoint.

A web application security testing system is provided. The system may be a computer system that may include one or more processors. The system may include an automated site-map tool. The automated site-map tool may be an application that when executed by the processor may be configured to retrieve a centralized web server log file associated with a web application. The centralized web server log file may be derived from a STEM. The STEM may aggregate all log files that may be associated with the web application and centralize the data into the centralized web server log file.

The centralized web server log file may capture all areas of the web application that users of the web application can access. The automated site-map tool may be configured to analyze each HTTP log entry in order to identify each endpoint that may be included in the web application. The centralized web server log file may include HTTP log entries. Each HTTP log entry may correlate to a request from a client to the web application and/or web server. Each HTTP log entry may include an endpoint and a server response code. The endpoint may be a URL path correlating to a location within the web application. The server response code may enable identifying a validity of each endpoint.

Server response codes may be a three-digit integer code giving the result of an attempt to understand and satisfy the request. The first digit of the server response code may indicate the class of the response. A valid server response code may indicate that the associated endpoint may be valid. The server response code may enable recognizing whether the request is a successful request or an unsuccessful request. Standard server response codes may be codes including classes 100, 200, 300, 400 and 500. Class 100 may be informational. Class 200 may indicate a successful request that was received, understood and accepted. Class 300 may indicate that further action may be required in order to complete a request. Class 400 may indicate a client error. The client error may be due to bad syntax and/or the request cannot be fulfilled. Class 500 may indicate a server error. The server may have failed to fulfill a valid request.

The automated site-map tool may categorize each HTTP log entry as either a valid HTTP log entry or an invalid HTTP log entry based on the server response code. A HTTP log entry may be considered invalid when the browser request includes bad syntax or cannot be fulfilled. The HTTP log entry may be considered invalid when the server failed to fulfill the request. The server may fail to fulfill the request when the web page linked to the URL path may no longer be active and/or the web page linked to the URL path may be broken.

In order to generate a true site-map of the web application, the system may further investigate the reason the request is unsuccessful. This may enable identifying areas within the web application that may no longer be active. This may further enable identifying areas within the web application that may be active but may be inaccessible.

For each non valid HTTP log entry, the automated site-map tool may be configured to, when the URL path associated with the HTTP log entry is linked to a non-active web page on the web application, delete the HTTP log entry. The automated site-map tool may be configured to, when the URL path associated with the HTTP log entry is linked to an active web page on the web application, correct the URL path associated with the HTTP log entry. Following the correcting of the URL path, the automated site-map tool may be enabled to re-categorize the invalid HTTP log entry as a valid HTTP log entry.

Based on the identification of each valid endpoint included in the centralized web server log file, the automated site-map tool may be configured to generate a first web application site-map.

Prior to the generating of the first web application site-map, the automated site-map tool may further be enabled to remove duplicate endpoints from the centralized web server log file. The automated site-map tool may also execute a function to standardize the endpoints. The centralized web server log file may include numerous HTTP log entries that may seem to be different but may be logically identical. The tool may be enabled to standardize those entries in order to be enabled to remove these logically identical endpoints.

The system may also include a web application attack tool. The web application attack tool may be an application that when executed by the one or more processors, may be enabled to perform as a virtual user of the web application in order to simulate a malicious attack on the web application. This simulation of an attack may be performed as a security assessment of the web application. Simulating an attack may enable identification of weaknesses and security bugs that may exist within the application. By identifying these weaknesses and bugs, the system may be enabled to repair these issues thereby preventing and/or at least mitigating malicious attacks occurring within the web application.

The web application attack tool may be configured to simulate an attack by logging into a web application via an accredited user ID. The tool may then gain access to all locations on the web application for which a user of the web application has access to. The simulating may further include crawling each endpoint within the web application enabled to be accessed via the accredited user ID. By crawling each endpoint, the web application attack tool may be enabled to identify one or more weak points and security bugs that may exist within the web application.

The simulation of the attack may enable a "black-box" assessment of the web application. A black-box assessment may refer to an assessment that may not include full knowledge of the web application. Since the web application attack tool accesses the web application as a virtual user/attacker, the tool may not have a complete blueprint of the web application and may not access each endpoint within the web application.

The web application attack tool may aggregate each weak point and/or security bug identified within the web application and transmit the data to the web application developer/engineer to fix the vulnerabilities. The web application attack tool may also be enabled to, based on the crawling, generate a second web application site-map that may include each crawled endpoint on the web application.

The system may also include a data integration tool. The data integration tool may be configured to, when executed by the one or more processors, retrieve the first web application site-map from the automated site map tool. The data integration tool may retrieve the second web application site-map from the web application attack tool. The data integration tool may scan each of the first web application site-map and the second web application site-map to determine one or more endpoints within the web application that may have not been assessed by the web application attack tool during a security assessment process via a simulation of a web attack on the web application. The scanning may enable identifying one or more endpoints in the first web application site-map not included in the second web application site-map. The one or more endpoints not found on the second web application site-map may be the endpoints that may not have been included in the endpoints crawled during the security assessment on the web application.

The data integration tool may be further configured to generate a real-time web application footprint. The real-time web application footprint may list each valid HTTP log entry included in the first web application site map and each crawled endpoint included in the second web application site map. The data integration tool may override the first web application site-map and the second web application site-map with the generated real-time web application footprint.

Following the generating of the real-time web application footprint, the web application attack tool may be configured to re-crawl the web application for security vulnerabilities. The real-time web application footprint may increase the effectiveness of security assessment because the entire application may now be enabled to be scanned. This may curve the "black-box" security assessment into a "grey-box" security assessment.

Since log files may include duplicates of endpoints, the system may be enabled to scan the log file and remove any one or more duplicate endpoints. The log files may also include multiple endpoints that may not be identical but may be logically identical. For example, the log file may include multiple endpoints with the same URL path. However the date that is included in the URL path may be different. Each of these multiple endpoints may be linked to the same location within the web application but may appear to be different within the log file because of the different dates. The system may be enabled to standardize the endpoints that may be logically identical in order to remove these duplicate logically identical endpoints.

In another embodiment a method for leveraging log data to enhance web application security testing is provided. The method may include receiving a centralized web server log file. The centralized web server log file may be a comma-separated values ("CSV") file.

The centralized web server log file may be associated with a production web application. The production web application may be a web application that is already produced and exposed to the internet. The web server log file may include production web HTTP log entries. Each production web HTTP log entry may include a URL path of a location within a web application and an associated server response code.

The method may include filtering, the centralized web server log file. The filtering may include identifying duplicate URL paths. The filtering may also include counting the duplicate URL paths. The method may further include determining, based on the counting, a total count of the duplicate URL paths. The method may also include maintaining one of each duplicate URL paths and deleting the total count minus one of each identified duplicate URL path.

The filtering of the centralized web server log file may be a first tier of filtering. The method may also include following the first tier of filtering, filtering on a second tier of filtering. The second tier of filtering may include filtering URL paths that include an identical portion and a non-identical portion. The filtering may include identifying one or more URL paths that include an identical portion and a non-identical portion. The non-identical portion may correspond to a predetermined matching pattern data element. The filtering may include replacing the non-identical portion in each of the URL paths with a standardized placeholder data element. Following the replacing, the method may further include re-executing the first tier of filtering.

For each of the production web HTTP log entries, the method may include using the associated server response code to categorize the production web HTTP log entries. The categorizing may include either a valid production web HTTP log entry or an invalid production web HTTP log entry.

The method may further include extracting each valid production web HTTP log entry to generate a first site-map. The first site-map may include each of the valid production web HTTP log entries.

The method may also include receiving a web attack tool log file associated with a pre-production web application. The web attack tool log file may be an extensible markup language ("XML") file. The pre-production web application may be the production web application prior to being completed and exposed to the internet. The web attack tool data file may be generated from a security assessment performed on the pre-production web application.

It should be appreciated that the method may include receiving the web attack tool log file at the same time as the centralized web server log file. The method may include receiving the web attack tool log file prior to, or following the receipt of, the centralized web server log file.

The web attack tool data file may include pre-production web HTTP log entries. Each pre-production web HTTP log entry may include a URL path. The URL path may be a location within a pre-production version of the web application. The pre-production web HTTP log entry may also include a server response code associated with the URL path. Each URL path may be a location on the web application that may have been assessed for security vulnerabilities by the web attack tool.

The method may include filtering the web attack tool log file. The filtering may include identifying duplicate URL paths within the web attack tool log file. The filtering may also include counting the duplicate URL paths. The method may further include determining, based on the counting, a total count of the duplicate URL paths. The method may also include maintaining one of each duplicate URL paths and deleting the total count minus one of each identified duplicate URL path.

The filtering of the web attack log file may be a first tier of filtering. The method may also include following the first tier of filtering, filtering on a second tier of filtering for the web attack tool log file. The second tier of filtering may include filtering URL paths that include an identical portion and a non-identical portion. The filtering may include identifying one or more URL paths that include an identical portion and a non-identical portion. The non-identical portion may correspond to a predetermined matching pattern data element. The filtering may include replacing the non-identical portion in each of the URL paths with a standardized placeholder data element. Following the replacing, the method may further include re-executing the first tier of filtering.

For each of the pre-production web HTTP log entries, the method may include using the associated server response code to categorize the pre-production web HTTP log entries as either a valid pre-production web HTTP log entry or an invalid pre-production web HTTP log entry.

The method may further include extracting each valid pre-production web HTTP log entry to generate a second site-map. The second site-map may include each of the valid pre-production web HTTP log entries.

Following the generating of the second site-map, the method may include identifying and storing in a first data set, one or more production web HTTP log entries from the first site-map that may be absent from the second site-map.

The method may also include, following the generating of the second site-map, identifying and storing in a second data set, one or more pre-production web HTTP log entries from the second site-map that may be absent from the first site-map.

The HTTP log entries stored in the second data set may be non-operable URL paths. The method may further include identifying a web page correlating to each non-operable URL path. When the web page is an operating web page, the method may include correcting the non-operable URL path to be an operable URL path. When the web page is a non-operable web page, the method may include deleting the production web HTTP log entry associated with the non-operable URL path.

Non-operable URL paths may be due to a server error. The non-operable URL paths may be due to a syntax error within the URL path. Based on the server response code, the system may be enabled to identify the basis for the non-operable URL path.

The method may further include generating a web application footprint. The web application footprint may be a footprint that may list all of the valid production web HTTP log entries and all of the valid pre-production web HTTP log entries.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an exemplary diagram of a system 100 for the integration of HTTP log data to enhance web application vulnerability testing. Web application 102 may be configured to receive requests from one or more users. Web application 102 may be in communication with one or more web servers. The one or more web servers may be configured to interpret and execute each received request. The one or more web servers may also store each request in a log file.

There may be one log file stored on one web server that may include all requests received at the web application. There may be more than one web server storing all the requests.

The web application 102 may use a SIEM application to centralize all the log files associated with the web application. The STEM application may aggregate each log file from each web server and centralize the data, as shown at the STEM application 104.

System 100 may also include a web application attack tool 106. The web application attack tool 106 may be configured to collect automated and manual data from the web application. The web application attack tool may be configured to simulate an attack on the web application 102 in order to collect the data and assess the security of the web application 102. By simulating an attack on web application 102, web application attack tool 106 may be enabled to identify vulnerabilities and risks within the web application 102, as shown at 108.

Web application attack tool 106 may simulate an attack by performing as a virtual user of the web application 102. The tool 106 may login to the web application 102 by providing authentication credentials. The tool may then gain access to the web application 102 and be enabled to crawl through the application as a virtual user. The tool may be configured to crawl each folder and file within the application 102 that is accessible via the user. When crawling the web application, the tool 106 may be enabled to generate a site map of the web application, as shown at 110, from a user's standpoint.

The centralized log file at 104 may be retrieved by an integration application 112. The web application site map, as shown at 110, may also be retrieved by integration application 112. Integration application 112 may be operable to analyze and extract the relevant data and meaningful data from each of the centralized log file 104 and the web application site map 110. Integration application 112 may aggregate the data within the centralized log file 104 and transform each endpoint within the log file 104 into a set of meaningful data, as shown at 114. Integration application 112 may also aggregate the data within the web application site map 110 and transform each endpoint within the site map 110 into a second set of meaningful data, also shown at 114. The data aggregation and transformation may be based on defined server response codes associated with HTTP requests. Server response codes may define a validity of the endpoint associated with an HTTP request. Server response codes may define whether an endpoint is a valid or invalid endpoint, based on stored server response codes and their associated definitions, as shown at 120.

The two sets of data may be compared at 114. The comparison may be in order to identify one or more portions of the web application 102 that may have not been assessed by the web application attack tool 106, as shown at 116. The comparison may also be performed in order to identify one or more portions of the web application not accessible by users of the web application, as shown at 118.

The portions of the web application that may not be accessible by users of the web application, as shown at 118, may be transmitted to a web application engineer that may be authorized to improve customer experience on the web application 102, as shown at 122.

Figure 2:
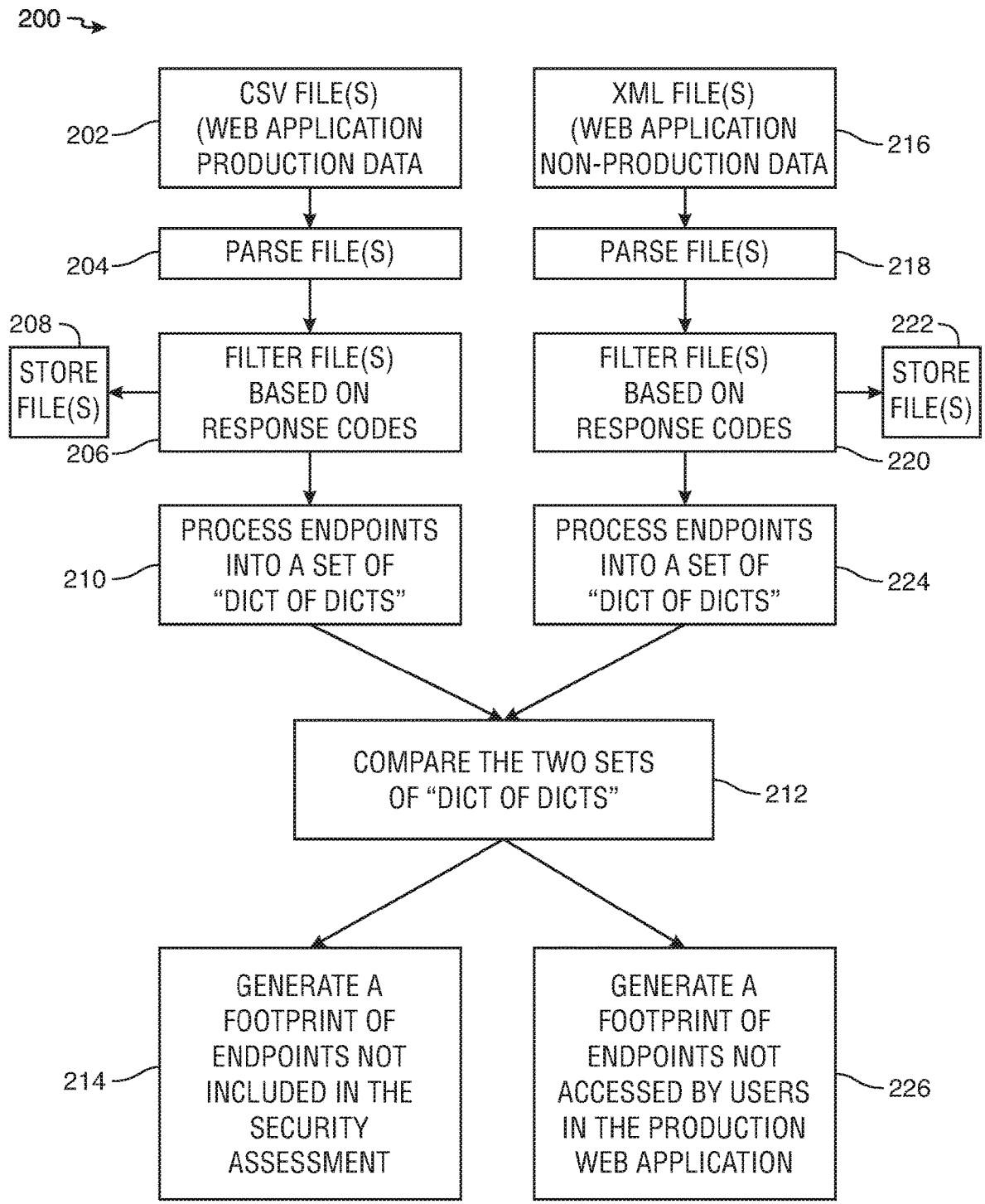
FIG. 2 shows an illustrative flowchart in accordance with principles of the invention.

FIG. 2 shows a flowchart 200 of the system for leveraging log data to enhance web application security testing. At step 202, the system may include receiving input of a CSV file including web application production data. At step 204, the system may parse the file. At step 206, the system may filter the file. Each HTTP log entry within the file may be filtered based on the associated response code. The file, following the filtering, may be stored in a repository, as shown at 208. At step 210, each endpoint identified within each HTTP log entry may be processed and stored in a first dictionary as a set of "dict of dicts." The dictionary may store the endpoints as key-value pairs. Each key may be a directory within the web application and the corresponding value(s), may be an array of all endpoints within that directory.

Comparable steps may be taken to identify the endpoints that may be included in the XML file generated from a security assessment on the web application. At step 216, the XML, file may be retrieved. The XML, file may include a log file extracted from web application non-production data. At step 218, the log file may be parsed. At step 220, the system may include filtering the file. Each HTTP log entry within the file may be filtered based on the associated response code. The file, following the filtering, may be stored in a repository, as shown at 222.

At step 224, each endpoint identified within each HTTP log entry may be processed and stored in a second dictionary as a set of "dict of dicts." The dictionary may store the endpoints as key-value pairs. Each key may be a directory within the web application and the corresponding value(s), may be an array of all endpoints with that directory.

At step 226, the system may be configured to compare the first and second set of dictionaries. Based off of the comparison, the system may generate a footprint of endpoints that may have not been included in the security assessment, as shown at 228. The system may also be configured to, based off of the comparison, generate a footprint of endpoints not accessed by users in the application production web application, as shown at 226.

Figure 3:
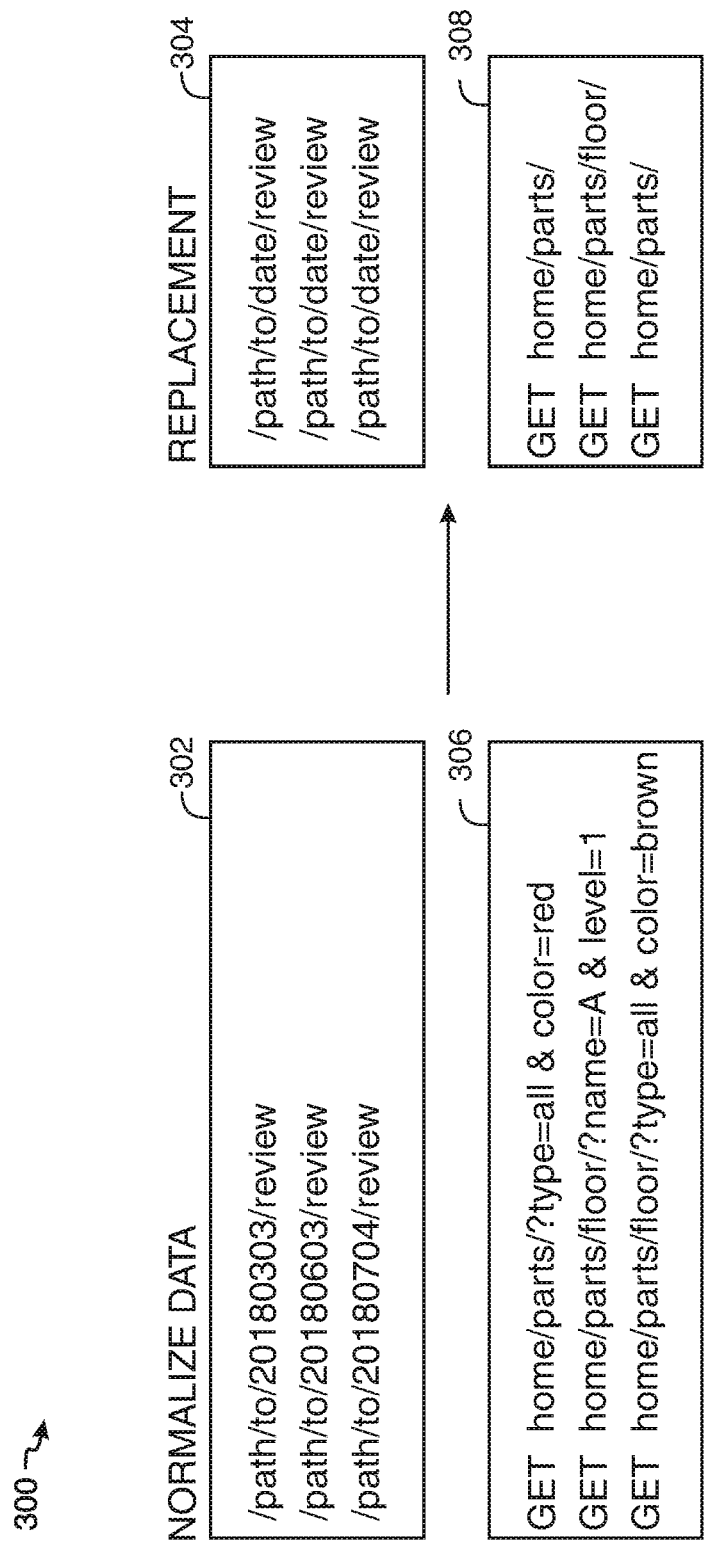
FIG. 3 shows another exemplary diagram in accordance with principles of the invention.

FIG. 3 shows an exemplary diagram 300 of multiple URL paths from a web server log file that may be standardized in accordance with principles of the invention. When conducting an analysis on HTTP log entries of a large web application, reducing the redundancy of data may be essential in performing an accurate analysis. Basic removal of duplicates may be simple, however there may be a redundancy of data that may not be identical but are logically identical.

Each URL path within display box 302 may not appear to be identical because the dates within each path are different. However, they all are pointing to the same location on the web application. The first URL path in display box 302 may be cited as "/path/to/20180303_review." The second URL path in display box 302 may be cited as "/path/to/20180603_review." Furthermore, the third URL path in display box 302 may be cited as "/path/to/20180704_review." Because these three endpoints include a different date, they may not be recognized as duplicates despite the fact that they have duplicate functionality.

In accordance with principles of the invention, there may be a normalizeData function that may be executed on the log file to identify and normalize logically identical URL paths. In this example, a normalizeData function may be executed. This function may be operable to identify explicit patterns within the log file. The function may then extract the endpoints identified to be within the pattern and run a replacement function on the identified endpoints. In this aforementioned example, all the dates that may be in the form of "YYMMDD" may be replaced with the word "date." Each URL path from display box 302 may be replaced with the word "date" as shown at display box 304.

Furthermore, the normalizeData function may also be operable to perform replacements on other text that may not actually be part of the URL path. For example, HTTP GET parameters may be deleted from the URL path. Deleting the parameters may enable a clearer discerning of the endpoints within the web application. Display box 306 may display URL paths that may include HTTP GET parameters. The function may remove the parameters from each URL path.

In some embodiments, multiple requests may be made to the same endpoint. However depending on the HTTP GET parameters included in the URL path, the server may respond with a different server response code. For example, multiple requests may be made to the URL path, i.e. —/dynamic_page.php. The server may respond with a "404 Not Found." The server may respond with a "200 OK." Each of these parameters may be stored in the "dict of dicts" as a separate endpoint. The replacement may be shown at display box 308. Removing the parameters may also enable logically identical duplicate endpoints to be deleted from the centralized web server log file. The function may also be operable to replace non-ASCCI with ASCCI characters to further enrich the data.

The normalizeData and replacement function may cut out a large amount of redundant data and enable a more manageable, logically-organized and more effective output, thereby enabling a better security assessment of the web application.

Figure 4:
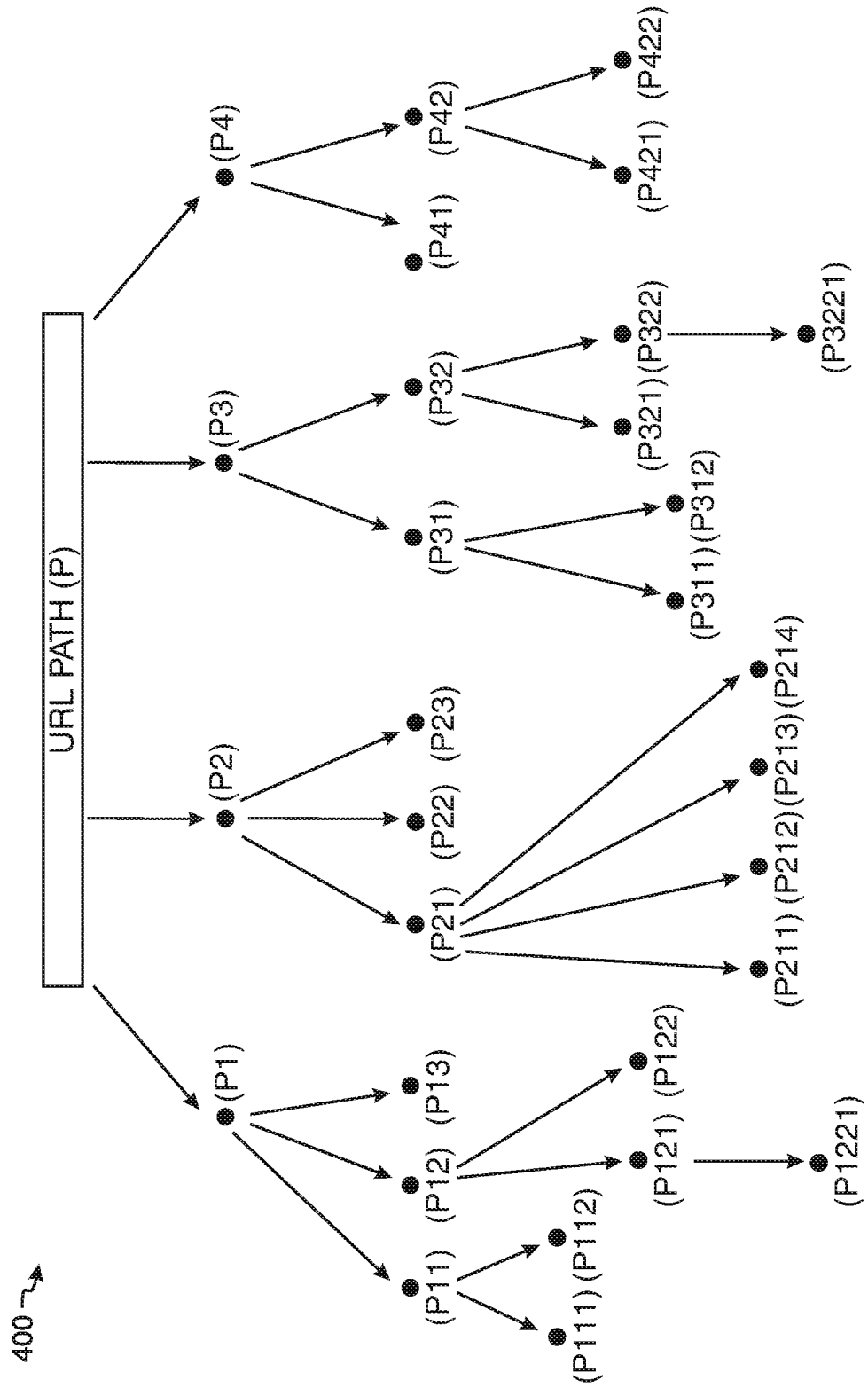
FIG. 4 shows another exemplary diagram in accordance with principles of the invention.

FIG. 4 shows an exemplary diagram of a hierarchical tree 400 of endpoints that may be extracted from a centralized web server log file. This hierarchical tree 400 may display the way the system, in accordance with principles of the invention, extracts each location within a web application based on the identified endpoints included in each HTTP log entry of a web server log file.

Web applications and/or websites may include a directory of all folders and files that may be included within each folder. Some applications and websites may include multiple folders and files. The system may include a function 'addResource' that may be enabled to, utilizing the log file, determine each directory layer and each sub-layer of the web application or website. Each HTTP log entry includes a URL path which is pointing to a directory layer or sub-directory layer. The function may be executed continuously until each location is located on the web application or website.

The system may execute a function 'addResource', on the centralized web server log file, to identify and extract each directory layer of a web application. The log file may be a CSV file including the HTTP log information. The function may further identify and extract each endpoint within each layer of the web application. In this exemplary diagram 400, the function may input a local path to the file—"P", which may be the first directory layer of the web application. The function may then retrieve each endpoint that may be included within directory layer P. These endpoints may be "P1", "P2", "P3" and "P4". The function may be a recursive function and may continuously repeat each directory layer to determine all endpoints within each layer. This may enable each endpoint within the web application to be captured. The function may output a data format of the hierarchical tree, i.e. —'a dictionary'. The dictionary may be displayed in FIG. 5.

It should be appreciated that this function 'addResource' may also be executed on the XML file that may have been generated following a security assessment of the web application by a web application attack tool. The function may include an input of a local path to the XML file and then may output a dictionary, as displayed in FIG. 5.

This exemplary hierarchical tree 400 may also be an exemplary diagram of a user-readable display of the data structure of a web application. This hierarchical tree 400 may be a real-time site map that may be implemented for security assessment of the web application.

FIG. 5 shows a data set 500 of a dictionary of endpoints processed in FIG. 4. The data set 'myDictionary' may include an array of endpoints for each directory layer within the web application. The dictionary includes a set of key-value pairs. Each key may be a directory/folder within the web application. The corresponding value(s) for each key may be the sub-folder/file within each of the directories/folders.

It should be appreciated that data set 500 may be enabled to be printed as a user-readable hierarchical directory tree to enable a user-readable view of the site-map of the web application.

Thus, methods and apparatus for leveraging web server log files to generate site maps for use in web application testing are provided. Persons skilled in the art will appreciate that the present invention can be practiced by other than the described embodiments, which are presented for purposes of illustration rather than of limitation, and that the present invention is limited only by the claims that follow.

What is claimed is:

1. A web application security testing system comprising:
    an automated site-map tool configured to:
        retrieve a centralized web-server log file associated with a web application;
        analyze each hyper-text transfer protocol ("HTTP") log entry comprised in the centralized web-server log file, each HTTP log entry comprising an endpoint, the endpoint being a uniform resource locator ("URL") path correlating to a location within the web application;
        based on the analysis, identify each endpoint included in the web application; and
        generate a first web application site-map based on each identified endpoint;
    a web application attack tool configured to simulate a malicious attack, the simulating comprising:
        logging into the web application via an accredited user ID; and
        crawling each endpoint within the web application enabled to be accessed via the accredited user ID to identify one or more weak points and security bugs within the web application;
    the web application attack tool further configured to, based on the crawling, generate a second web application site-map comprising each crawled endpoint; and
    a data integration tool configured to:
        determine one or more endpoints within the web application non-assessed by the web application attack tool by identifying one or more endpoints in the first web application site-map absent from the second web application site-map.

2. The system of claim 1 wherein the web server log file is derived from a Security Information and Event Management System ("SIEM").

3. The system of claim 1 wherein each HTTP log entry further comprises a server response code associated with each endpoint.

4. The system of claim 3 wherein the automated site-map tool is further configured to, based on the server response code, categorize each HTTP log entry as either a valid HTTP log entry or an invalid HTTP log entry.

5. The system of claim 4 wherein the data integration tool is further configured to, for each non valid HTTP log entry:
    when the URL path associated with the HTTP log entry is linked to a non-active web page on the web application, delete the HTTP log entry; and
    when the URL path associated with the HTTP log entry is linked to an active web page on the web application, revise the URL path associated with the HTTP log entry and re-categorize the invalid HTTP log entry as a valid HTTP log entry.

6. The system of claim 5 wherein the data integration tool is further configured to:
    generate a real-time web application footprint listing each valid HTTP log entry comprised in the first web application site map and each crawled endpoint comprised in the second web application site map; and
    override the first web application site-map and the second web application site-map with the generated real-time web application footprint.

7. The system of claim 6 wherein the web application attack tool is further configured to, based on the real-time web application footprint, re-crawl the web application for security vulnerabilities.

8. A method for securely testing a web application, the method comprising:
analyzing each hyper-text transfer protocol ("HTTP") log entry comprised in a centralized web server log file of a web application, each HTTP log entry comprising an endpoint, the endpoint being a uniform resource locator ("URL") path correlating to a location on the web application;
based on the analysis, identifying each endpoint included in the web application;
generating a first web application site-map based on each identified endpoint;
determining one or more endpoints on the first web application site map absent from a second web application site map, the second web application site map comprising each crawled endpoint within the web application identified via a crawling of the web application by a web application attack tool for identifying security vulnerabilities.

9. The method of claim 8 further comprises generating a footprint of the web application, the footprint comprising the one or more endpoints from the first web application site map non-identified on the second web application site map and the crawled endpoints comprised in the second web application site map.

10. The method of claim 9 wherein the analyzing further comprises analyzing a server response code associated with each HTTP log entry and based on the server response code, categorizing each HTTP log entry as either a valid HTTP log entry or an invalid HTTP log entry.

11. The method of claim 10 further comprising, for each invalid HTTP log entry:
when the URL path associated with the HTTP log entry is linked to a non-active web page on the web application, deleting the invalid HTTP log entry;
when the URL path associated with the HTTP log entry is linked to an active web page on the web application, correcting the URL path associated with the HTTP log entry; and
re-categorizing the invalid HTTP log entry as the valid HTTP log entry.

12. The method of claim 11 further comprising:
generating a real-time web application footprint listing each endpoint comprised in each valid HTTP log entry and each endpoint comprised in the second web application site map; and
overriding the first web application site-map and the second web application site-map with the generated real-time web application footprint.

13. The method of claim 12 further comprising crawling each endpoint listed in the real-time web application footprint, via the web attack tool, to test for security vulnerabilities.

14. A method for leveraging log data to enhance web application security testing, the method comprising:
receiving a centralized web server log file associated with a production web application, the web server log file including production web hyper-text transfer protocol ("HTTP") log entries, each production web HTTP log entry comprising a uniform resource locator ("URL") path of a location within a web application and an associated server response code;
filtering, the centralized web server log file, the filtering comprising:
identifying duplicate URL paths;
counting the duplicate URL paths;
determining, based on the counting, a total count of the duplicate URL paths;
maintaining one of each duplicate URL paths; and
deleting the total count minus one of each identified duplicate URL path;
following the filtering, for each of the production web HTTP log entries, using the associated server response code to categorize the production web HTTP log entries as either a valid production web HTTP log entry or an invalid production web HTTP log entry;
extracting each valid production web HTTP log entry to generate a first site-map comprising each of the valid production web HTTP log entries;
receiving a web attack tool log file associated with a pre-production web application, the web attack tool data file comprising pre-production web HTTP log entries, each pre-production web HTTP log entry comprising a URL path of a location within a pre-production version of the web application and an associated server response code, each URL path being a location on the web application assessed for security vulnerabilities by the web attack tool;
filtering, the web attack tool log file, the filtering comprising:
identifying duplicate URL paths;
counting the duplicate URL paths;
determining, based on the counting, a total count of the duplicate URL paths;
maintaining one of each duplicate URL paths; and
deleting the total count minus one of each identified duplicate URL path;
for each of the pre-production web HTTP log entries, using the associated server response code to categorize the pre-production web HTTP log entries as either a valid pre-production web HTTP log entry or an invalid pre-production web HTTP log entry;
extracting each valid pre-production web HTTP log entry to generate a second site-map comprising each of the valid pre-production web HTTP log entries;
identifying and storing in a first data set, one or more production web HTTP log entries from the first site-map not found in the second site-map;
identifying and storing in a second data set, one or more pre-production web HTTP log entries from the second site-map not found in the first site-map; and
generating a web application footprint listing all of the valid production web HTTP log entries and all of the valid pre-production web HTTP log entries.

15. The method of claim 14 wherein the web server log file is a comma-separated values ("CSV") file.

16. The method of claim 14 wherein the web attack tool log file is an extensible markup language ("XML") file.

17. The method of claim 14 wherein the web attack tool data file is generated from a security assessment performed on the pre-production web application.

18. The method of claim 14 wherein each associated URL path comprised in each production web HTTP log entry stored in the second data set is a non-operable URL path and the method further comprises identifying a web page correlating to the non-operable URL path; and wherein:
when the web page is an operating web page, the method further comprises correcting the non-operable URL path to be an operable URL path; and when the web page is a non-operable web page, the method further comprises deleting the production web HTTP log entry associated with the non-operable URL path.

19. The method of claim 14 wherein the filtering of the web server log file is a first tier of filtering, the method further comprises:
   filtering, on a second tier of filtering, URL paths that include an identical portion and a non-identical portion, the filtering comprising:
      identifying one or more URL paths that include an identical portion and a non-identical portion, the non-identical portion corresponding to a predetermined matching pattern data element;
      replacing the non-identical portion in each of the URL paths with a standardized placeholder data element; and
      re-executing the first tier of filtering.

20. The method of claim 14 wherein the filtering of the web attack tool log file is a first tier of filtering, the method further comprises:
   filtering, on a second tier of filtering, URL paths that include an identical portion and a non-identical portion, the filtering comprising:
      identifying one or more URL paths that include an identical portion and a non-identical portion, the non-identical portion corresponding to a predetermined matching pattern data element;
      replacing the non-identical portion in each of the URL paths with a standardized placeholder data element; and
      re-executing the first tier of filtering.

* * * * *